(12) United States Patent
Zhu

(10) Patent No.: US 10,996,786 B2
(45) Date of Patent: May 4, 2021

(54) METHOD AND APPARATUS FOR CONTROLLING MULTI WINDOW DISPLAY IN INTERFACE

(71) Applicants:BEIJING JINGDONG SHANGKE INFORMATION TECHNOLOGY CO., LTD., Beijing (CN); BEIJING JINGDONG CENTURY TRADING CO., LTD., Beijing (CN)

(72) Inventor: Dewei Zhu, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 12 days.

(21) Appl. No.: 16/099,144

(22) PCT Filed: May 3, 2017

(86) PCT No.: PCT/CN2017/082819
§ 371 (c)(1),
(2) Date: Nov. 5, 2018

(87) PCT Pub. No.: WO2017/190649
PCT Pub. Date: Nov. 9, 2017

(65) Prior Publication Data
US 2019/0146625 A1 May 16, 2019

(30) Foreign Application Priority Data
May 5, 2016 (CN) .................. 201610293049.X

(51) Int. Cl.
*G06F 3/041* (2006.01)
*G06F 3/0481* (2013.01)
(Continued)

(52) U.S. Cl.
CPC .......... *G06F 3/0414* (2013.01); *G06F 3/0481* (2013.01); *G06F 3/04886* (2013.01); *G06F 9/451* (2018.02); *G06F 3/04817* (2013.01)

(58) Field of Classification Search
CPC .. G06F 3/0414; G06F 3/0481; G06F 3/04817; G06F 3/04886; G06F 9/451
See application file for complete search history.

(56) References Cited

U.S. PATENT DOCUMENTS 6,639,606 B1   10/2003  Choi
9,223,465 B2 *  12/2015  Louch ................. G06F 3/04817
(Continued)

FOREIGN PATENT DOCUMENTS

CN   101354629 A   1/2009
CN   102109944 A   6/2011
(Continued)

OTHER PUBLICATIONS

International Search Report and Written Opinion with English translation for Application No. PCT/CN2017/082819 dated Aug. 9, 2017 (14 pages).
(Continued)

*Primary Examiner* — Kwin Xie
(74) *Attorney, Agent, or Firm* — Michael Best & Friedrich LLP

(57) ABSTRACT

The present invention, which provides a method and apparatus for controlling a multi-window display in an interface, can display a plurality of application windows simultaneously and completely on the same interface, can control changes in size of the launched application windows by finger pressing, can display the application windows of corresponding sizes at different levels, and can also realize changes in size by squeezing between the plurality of application windows. The method for controlling a multi- (Continued)

window display in an interface according to the present invention comprises: defining a correspondence relationship between display levels of windows of a plurality of applications and pressure values applied on icons of the plurality of applications, determining the display levels of the windows according to the pressure values applied on the icons, displaying the windows in the interface according to the display levels, wherein the window having the highest priority is the window of a currently operated application, and, if the window having the highest priority intersects other windows, compressing the other windows according to a display size of the window having the highest priority, such that the plurality of windows are displayed in the interface without overlapping one another.

15 Claims, 3 Drawing Sheets

(51) Int. Cl.
*G06F 3/0488* (2013.01)
*G06F 9/451* (2018.01)

(56) References Cited

U.S. PATENT DOCUMENTS

| | | | | |
|---|---|---|---|---|
| 2009/0256857 | A1* | 10/2009 | Davidson | G06F 3/0481 345/619 |
| 2011/0191674 | A1* | 8/2011 | Rawley | G06F 3/016 715/702 |
| 2012/0096396 | A1* | 4/2012 | Ording | G06F 3/0481 715/799 |
| 2014/0068504 | A1* | 3/2014 | Sun | G06F 3/0481 715/794 |
| 2014/0237420 | A1* | 8/2014 | Song | G06F 3/04845 715/790 |
| 2016/0259470 | A1* | 9/2016 | Ledet | G06F 3/0416 |

FOREIGN PATENT DOCUMENTS

| | | |
|---|---|---|
| CN | 102165415 | 8/2011 |
| CN | 102968243 A | 3/2013 |
| CN | 104915169 A | 9/2015 |
| CN | 105159528 A | 12/2015 |
| CN | 105183284 A | 12/2015 |
| CN | 105955639 A | 9/2016 |

OTHER PUBLICATIONS

Australia Patent Office Examination Report No. 1 for Application No. 2017259344 dated May 25, 2019 (4 pages).
Australia Patent Office Examination Report No. 2 for Application No. 2017259344 dated Feb. 3, 2020 (4 pages).
China Patent Office Action for Application No. 201610293049.X dated Jul. 30, 2018 (7 pages).
China Patent Office Action for Application No. 201610293049.X dated Apr. 9, 2019 (6 pages).
China Patent Office Action for Application No. 201610293049.X dated Sep. 17, 2019 (6 pages).
Indonesia Patent Office Action for Application No. P00201808800 dated Feb. 11, 2020 (3 pages, English translation included).
Australian Patent Office Examination Report No. 3 for Application No. 2017259344 dated May 6, 2020 (5 pages).
Australian Patent Office Notice of Acceptance for Application No. 2017259344 dated May 26, 2020 (4 pages).
Thailand Patent Office Action for Application No. 1801006735 dated Apr. 24, 2020 (3 pages, Statement of relevance included).
Intellectual Property Office of India Examination Report for Application No. 201827044173 dated Jan. 19, 2021 (6 pages).

* cited by examiner

METHOD AND APPARATUS FOR CONTROLLING MULTI WINDOW DISPLAY IN INTERFACE

CROSS-REFERENCE TO RELATED APPLICATION(S)

This is a U.S. national stage entry of International Patent Application No. PCT/CN2017/082819, filed on May 3, 2017, which claims priority to Chinese Patent Application No. 201610293049.X, filed on May 5, 2016, the entire contents of each of which are fully incorporated herein by reference.

TECHNICAL FIELD

The present invention relates to the technical field of computers and software thereof, and, in particular, to a method and apparatus for controlling a multi-window display in an interface.

BACKGROUND ART

At present, 3D pressure sensors have been applied to mobile terminal devices such as mobile phones, and many domestic manufacturers are already chasing 3D pressure sensing technology. The principle of pressure touch is as follows: by touching a screen with a finger, the screen can sense a pressure of the finger; a pressure sensor device can generate different electrical signals according to area changes of the finger pressure; the CPU of a mobile terminal device such as a mobile phone receives an electrical signal generated by the pressure sensor device and then generates a corresponding command; and the user can perceive a change in the corresponding command generated by the pressure.

At present, the display mode of Apps (Application) on the mobile phone is generally only an icon mode or a full screen mode, and a multi-window scheme is adopted on some Android mobile phones. Specifically, a plurality of App windows can be displayed on the screen of a device such as a mobile phone. Nevertheless, these App windows are displayed in a stacked form, such a multi-window scheme is difficult to scale and not smart enough because there is no mouse, and a plurality of App windows displayed in a stacked form cannot be completely displayed on the same interface at the same time.

Moreover, in the process of using Apps, if there is a need to resize the launched App windows, the user can only resize the windows by clicking App icons to display the sizes of corresponding application windows and then using a two-finger operation, so that the scaling of the application windows is insufficient in all of controllability, convenience and fun.

SUMMARY OF THE INVENTION

In view of this, the present invention, which provides a method and apparatus for controlling a multi-window display in an interface, can display a plurality of application windows simultaneously and completely on the same interface, can control changes in size of the launched application windows simply by finger pressing, can display the application windows of corresponding sizes at different levels, and can also realize changes in size by mutual squeezing between the plurality of application windows, so as to increase convenience, fun and intelligence of the window control.

To achieve the above object, according to one aspect of the present invention, a method for controlling a multi-window display in an interface is provided.

A method for controlling a multi-window display in an interface, comprises: defining a correspondence relationship between display levels of windows of a plurality of applications and pressure values applied on icons of the plurality of applications; determining the display levels of the windows according to the pressure values applied on the icons, the display levels including display sizes; and displaying the windows in the interface according to the display levels, wherein there are a plurality of windows that have priorities, and the window having the highest priority is the window of a currently operated application, and, if the window having the highest priority intersects other windows when the plurality of windows are displayed, compressing the other windows according to a display size of the window having the highest priority, such that the plurality of windows are displayed in the interface without overlapping one another.

Optionally, whether the window having the highest priority intersects the other windows is determined by judging a positional relationship between a vertex closest to the other windows, among vertices of the window having the highest priority, and the other windows; and the step of compressing the other windows according to a display size of the window having the highest priority comprises: adjusting display sizes of the other windows according to the display size of the window having the highest priority until the other windows do not intersect the window having the highest priority, wherein the display sizes vary according to the display levels.

Optionally, prior to the step of displaying the windows in the interface according to the display levels, the method comprises: determining that the application windows are launched in a non-full screen mode.

Optionally, the step of determining that the application windows are launched in a non-full screen mode comprises: comparing pressure values applied on the icons within a preset time with a preset pressure threshold; and launching the application windows in a non-full screen mode if the pressure values are greater than the pressure threshold.

Optionally, the display sizes of the windows corresponding to the display levels of the windows are fixed sizes, or the display sizes increase proportionally as the display levels increase.

According to another aspect of the present invention, an apparatus for controlling a multi-window display in an interface is provided.

An apparatus for controlling a multi-window display in an interface, comprises: a correspondence relationship definition module for defining a correspondence relationship between display levels of windows of a plurality of applications and pressure values applied on icons of the plurality of applications; a display level determination module for determining the display levels of the windows according to the pressure values applied on the icons, the display levels including display sizes; and an interface window display module for displaying the windows in the interface according to the display levels, wherein there are a plurality of windows that have priorities, and the window having the highest priority is the window of a currently operated application, and, if the window having the highest priority intersects other windows when the plurality of windows are displayed, compressing the other windows according to a display size of the window having the highest priority, such that the plurality of windows are displayed in the interface without overlapping one another.

Optionally, the interface window display module is further used for: determining whether the window having the highest priority intersects the other windows by judging a positional relationship between a vertex closest to the other windows, among vertices of the window having the highest priority, and the other windows; and for: adjusting display sizes of the other windows according to the display size of the window having the highest priority until the other windows do not intersect the window having the highest priority, wherein the display sizes vary according to the display levels.

Optionally, the interface window display module is further used for: determining that the application windows are launched in a non-full screen mode.

Optionally, the interface window display module is further used for: comparing pressure values applied on the icons within a preset time with a preset pressure threshold; and launching the application windows in a non-full screen mode if the pressure values are greater than the pressure threshold.

Optionally, the display sizes of the windows corresponding to the display levels of the windows are fixed sizes, or the display sizes increase proportionally as the display levels increase.

According to a further aspect of the present invention, an electronic device is provided, comprising: one or more processors; and a memory for storing one or more programs, wherein when the one or more programs are executed by the one or more processors, the one or more processors are enabled to implement a method for controlling a multi-window display in an interface.

According to a further aspect of the present invention, a computer readable medium is provided, on which a computer program is stored, characterized in that: the program, when executed by a processor, implements a method for controlling a multi-window display in an interface.

According to the technical solution of the present invention, a correspondence relationship between display levels of windows of a plurality of applications and pressure values applied on icons of the plurality of applications is defined; the display levels of the windows are determined according to the pressure values applied on the icons; and the windows are displayed in the interface according to the display levels, wherein the window having the highest priority is the window of a currently operated application, and, if the window having the highest priority intersects other windows, the other windows are compressed according to a display size of the window having the highest priority, such that the plurality of windows are displayed in the interface without overlapping one another. The use of the technical solution of the present invention can display a plurality of application windows completely and simultaneously on the same interface, can control changes in size of the launched application windows simply by finger pressing, can display the application windows of corresponding sizes at different levels according to different finger pressures, and can also realize changes in size by mutual squeezing between the plurality of application windows, so as to increase convenience, fun and intelligence of the window control.

BRIEF DESCRIPTION OF THE DRAWINGS

The figures are used for a better understanding of the present invention, and do not constitute improper limitations to the present invention, wherein.

DETAILED DESCRIPTION OF THE EMBODIMENTS

Hereinafter, the exemplary embodiments of the present invention are described with reference to the figures, wherein various details of the embodiments of the present invention are included to facilitate the understanding, and the embodiments of the present invention should be considered as only exemplary ones. Therefore, those skilled in the art should recognize that various changes and modifications may be made to the embodiments described herein without departing from the scope and spirit of the present invention. Also, descriptions of well-known functions and structures are omitted in the following description for clarity and conciseness.

Figure 1:
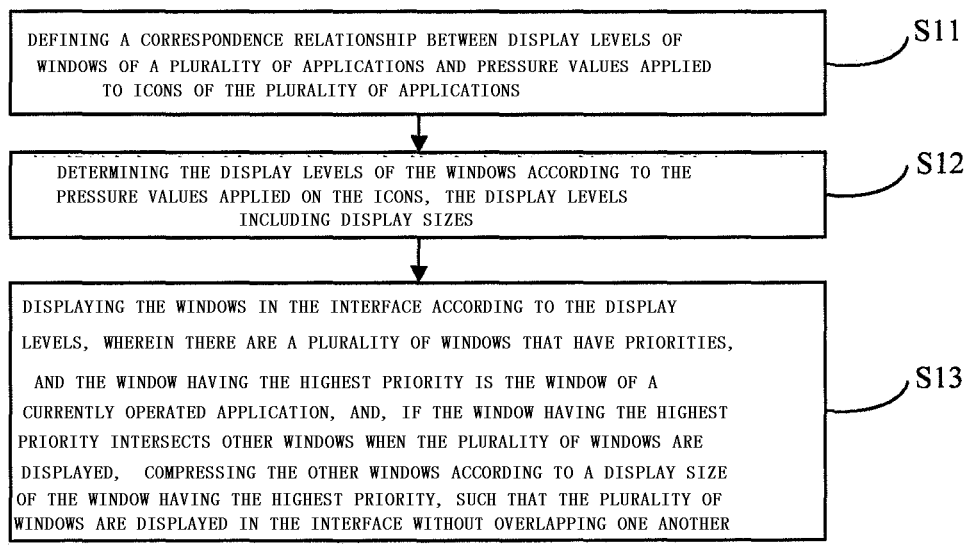
FIG. 1 is a schematic diagram of main steps of a method for controlling a multi-window display in an interface according to an embodiment of the present invention.

FIG. 1 is a schematic diagram of main steps of a method for controlling a multi-window display in an interface according to an embodiment of the present invention.

As shown in FIG. 1, the method for controlling a multi-window display in an interface according to the embodiment of the present invention mainly comprises Step S11 to Step S13.

Step S11: defining a correspondence relationship between display levels of windows of a plurality of applications and pressure values applied on icons of the plurality of applications.

When the screen of a touch terminal device such as a mobile phone or a Pad senses a pressure exerted by the user's finger on an application icon through a pressure sensor device inside the terminal device, the pressure sensor device can detect pressure values applied on the icons of a plurality of applications. After detecting that the pressure values are continuously applied for a predetermined pressing time t1, a plurality of display levels may be defined correspondingly as the pressure values increase, and the display size and displayed content items of the corresponding window are defined for each display level, thereby establishing a one-to-one correspondence relationship between the display levels of the windows of the plurality of applications and the pressure values applied on the icons of the plurality of applications. As the terminal device system can transmit numerical values of the window display sizes in the above display levels to an operating system platform layer, an API interface of the operating system can acquire the numerical values of the display sizes, so that, during a subsequent display of the windows, the windows may be displayed as window sizes corresponding to the corresponding numerical values. Therefore, when the user applies pressures on the application icons, the sizes of the application windows may also change as the pressure values change. In order to distinguish the action of pressing the icons from the existing action of clicking on the screen icons, the pressing time t1 is usually set to a numerical value greater than the screen click time, and this numerical value is preferably several hundred milliseconds or more.

Specifically, taking the circumstance where four display levels are defined and the pressure exerted by the user acts on a music App (Application) as an example, the display size and displayed content items of the window corresponding to each display level are pre-defined. Specifically, the display size and displayed content items of the window corresponding to each display level can be defined by sub-programs in the window program, each sub-program corresponds to a display level, and the number and size of content items included in the corresponding display level, the layout between content items, the functionality displayed by each content item (e.g., the function of displaying the album name of music) and the display size of the window corresponding to each display level are specified in each sub-program. For example:

when the display level is level 1, the display size of the window is a display size a1, and the displayed content items include a music name, and play and stop buttons;

when the display level is level 2, the display size of the window is a display size a2, and the displayed content items include a music name, an album name of the music, and play and stop buttons;

when the display level is level 3, the display size of the window is a display size a3, and the displayed content items include a music name, an album name of the music, lyrics, and play and stop buttons;

when the display level is level 4, the display size of the window is a display size a4, and the displayed content items include a music name, an album name of the music, lyrics, singer-related information, play and stop buttons, etc.

The display sizes of the windows, which are display sizes a1, a2, a3 and a4, may be customized fixed sizes, and the display sizes a1, a2, a3 and a4 are in ascending order.

The display size a4 may also be a full screen size.

Then, four pressure thresholds are set accordingly. For example, pressure thresholds b1-b4 are set and the numerical values of b1-b4 are in ascending order. When the predetermined pressing time t1 is reached, the window display level, when the pressure value applied on the icon of the music App is greater than the pressure threshold b1, is set to level 1, the window display level, when the pressure value is greater than the pressure threshold b2, is set to level 2, the window display level, when the pressure value is greater than the pressure threshold b3, is set to level 3, and the window display level, when the pressure value is greater than the pressure threshold b4, is set to level 4.

There is a need to indicate that the display sizes of the windows corresponding to the display levels of the windows may be fixed sizes, or the display sizes may also increase proportionally as the display levels increase. The specific manner, in which the display sizes of the windows change with the display levels of the windows, is preset in the window program. If the display sizes of the windows corresponding to the display levels of the windows are set to fixed sizes in the window program, as the pressure values applied on application icons change, the windows will not support changing the sizes proportionally, but will change the sizes according to the predetermined fixed sizes. The technical solution of the present embodiment is applicable to, but not limited to, the music App, and the applications may also be other Apps installed on the touch mobile terminal device such as a video App. As for the application where the content items displayed in the window are relatively not diverse, such as the video App (for example, the application may display only the video playback content), at the time of defining the display size of the window corresponding to each display level, it can be specified that the display size of the window increases proportionally as the display level increases.

S12: determining the display levels of the windows according to the pressure values applied on the icons, the display levels including display sizes.

Taking the above music App (Application) as an example, if the pressure value applied on the icon of the App exceeds the pressure threshold b1 after the predetermined pressing time t1 is reached, according to the correspondence relationship defined in Step S11, the display level corresponding to the pressure value is level 1. Thus, when the pressure value is applied on the icon of the music App, the music app will display a window size of a1, and the window displays a music name, and play and stop buttons.

Similarly, if the icon of the music App is continuously pressed, and the pressure value increases gradually until the pressure threshold b2 is exceeded, according to the above correspondence relationship, the display level corresponding to the pressure value is level 2. Thus, the window display of the current music App is of a display size a2, and the window displays a music name, an album name of the music, and play and stop buttons. When the user press is continued so that the pressure value exceeds the pressure threshold b3, the display level corresponding to the pressure value is level 3. Accordingly, the window display is of a display size a3, and the window displays a music name, an album name of the music, lyrics, and play and stop buttons. When the pressure value exceeds the pressure threshold b4, the display level corresponding to the pressure value is level 4. Accordingly, the window display is of a display size a4, and the window displays a music name, an album name of the music, lyrics, singer-related information, play and stop buttons, etc.

The change process of the above pressure value and the display level of the window reflects that the display level of the window increases gradually as the pressure value applied on the application icon increases, so that the display size of the window increases gradually and the content items displayed in the window also change. Those skilled in the art can understand that the display size of the window increases as the pressure value increases, and when the application window reaches a relatively large display size, if the user desires to reduce the display size of the window, there is only a need to reduce the pressure value applied on the application icon. For example, if the current window display level is 3 and the corresponding window display size is a3, when the pressure value applied on the application icon is reduced so that the pressure value is less than the pressure threshold b3 and greater than b2, the display level of the window corresponding to the current pressure value is 2, and the display size of the window is also correspondingly changed from the original a3 to a2, thereby realizing the process of reducing the display size of the window.

S13: displaying the windows in the interface according to the display levels, wherein there are a plurality of windows that have priorities, and the window having the highest priority is the window of a currently operated application, and, if the window having the highest priority intersects other windows when the plurality of windows are displayed, compressing the other windows according to a display size of the window having the highest priority, such that the plurality of windows are displayed in the interface without overlapping one another.

In this step, whether the window having the highest priority intersects the other windows is determined by judging a positional relationship between a vertex closest to the other windows, among vertices of the window having the highest priority, and the other windows; and the other windows are compressed according to the display size of the window having the highest priority. Specifically, display sizes of the other windows can be adjusted according to the display size of the window having the highest priority until the other windows do not intersect the window having the highest priority, wherein the display sizes vary according to the display levels.

Figure 2:
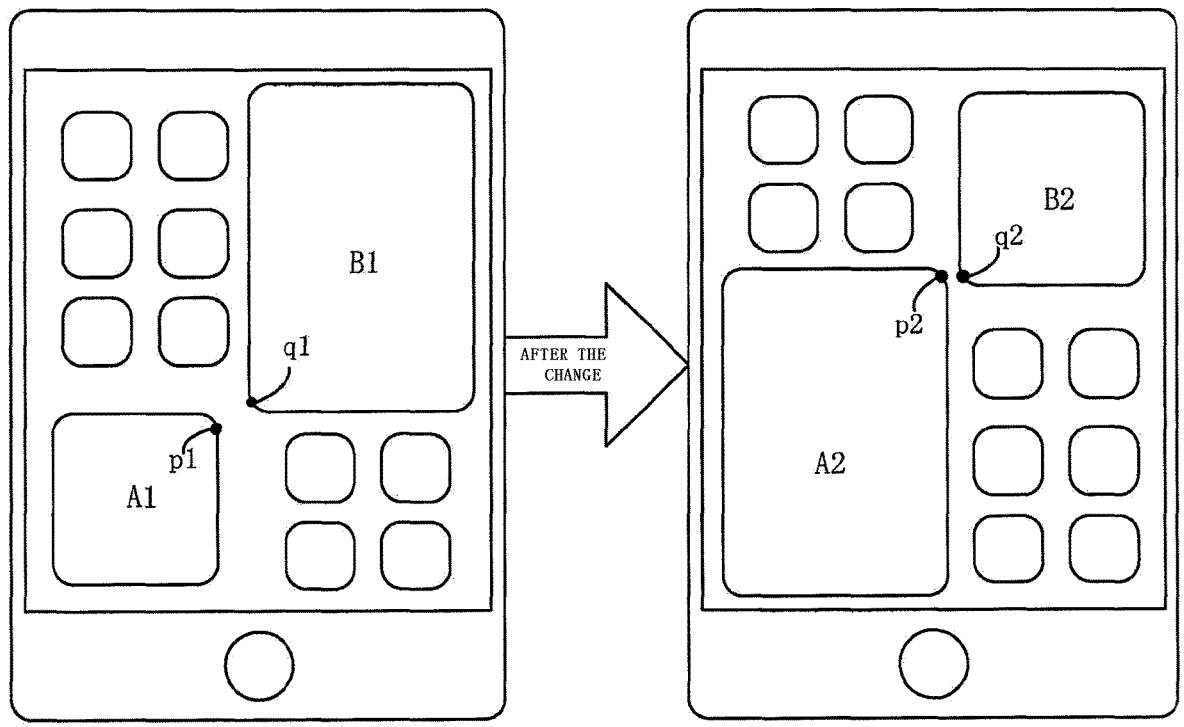
FIG. 2 is a schematic diagram of squeezing changes of a plurality of windows displayed in an interface according to one embodiment of the present invention.
Figure 3:
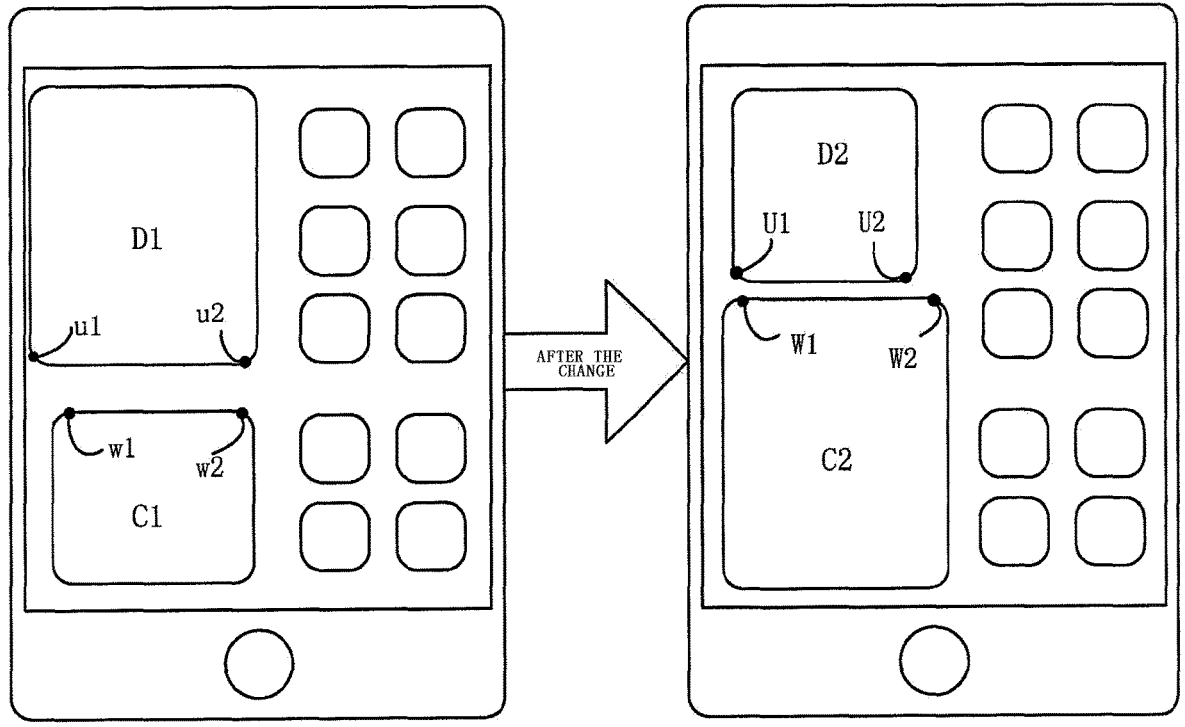
FIG. 3 is a schematic diagram of squeezing changes of a plurality of windows displayed in an interface according to another embodiment of the present invention.

In order to more specifically explain the specific method of determining whether the window having the highest priority intersects the other windows by judging a positional relationship between a vertex closest to the other windows, among vertices of the window having the highest priority, and the other windows and the specific process of compressing the other windows according to the display size of the window having the highest priority, the implementation process of the present invention is introduced hereinafter by taking the circumstance where two windows are simultaneously displayed in the same interface as an example. FIGS. 2 and 3 exemplarily illustrate schematic diagrams of squeezing changes of a plurality of windows displayed in an interface according to embodiments of the present invention.

As shown in FIG. 2, FIG. 2 shows a schematic diagram of squeezing changes of a plurality of windows displayed in an interface according to one embodiment of the present invention. In the left and right interfaces in FIG. 2, the left interface is an interface before the change, the currently operated window is A1, the current display level is level 1, one vertex of A1 is p1, and the coordinates of the vertex p1 are p1 (x1, y1); B1 is a window that is currently not operated and displayed in the interface, the current display level of B1 is level 3, one vertex of B1 is q1, and the vertex coordinates of q1 is q1 (x2, y2), wherein x2>x1 and y2>y1. Since the currently operated window A1 has the highest priority, as the pressure value applied on the App icon of A1 increases, the window display level of A1 also increases, and the display size of A1 increases accordingly, so that the window B1 will be compressed according to the display size of A1. As shown in the right interface diagram in FIG. 2, the display size of A1 in the left interface changes with the window display level of A1, and the changed window A1 corresponds to the window A2 in the right interface, and the window B1 will be compressed according to the display size of A1, in the left interface, to correspond to the window B2 in the right interface. Accordingly, the vertex p1 of A1 in the left interface moves to the position of the vertex p2 in the right interface, and the vertex q1 of B1 in the left interface moves to the position of the vertex q2 in the right interface.

Thus, whether the window A1 intersects the window B1 can be determined just by judging a positional relationship between a vertex closest to the window B1 (i.e., p1), among vertices of the window A1, and the window B1. Specifically, a coordinate relationship between the vertex coordinates p1 and q1 of the window A1 and the window B1 can be judged. As shown in FIG. 2, the window A1 is located in the lower left corner of the screen interface, and when one side of the window reaches the edge of the screen interface, it will be extended to the inside of the screen interface along the direction of an opposite side. In this case, as the display level of the window A1 increases, the motion trajectory of the vertex p1 will move toward the direction of the vertex q1 closest to the window A1 in the window B1, and if the coordinate values (x1, y1) of p1 exceed the coordinate values (x2, y2) of the vertex q1, it is determined that the window A1 intersects the window B1.

When the window A1 intersects the window B1, as the pressure value applied on the application icon corresponding to the window A1 continues to increase, the window display level of A1 rises, and the window A1 will squeeze the display size of the window B1 to change. There is a need to indicate that when the window A1 squeezes the display size of the window B1 to change, the window B1 changes the display size according to the display level. The squeezing results are, for example, a window A2 and a window B2 in the right interface diagram in FIG. 2; for example, the current display level of the window A2 is level 3, and the display level of B2 is determined according to the current display size of the window A2. Assuming that the display level of B2 is reduced from the original level 3 of the window B1 to the current level 2 with the squeezing of the window A2, if, at this time, the coordinate values of the vertex p2 of A2 are still greater than the coordinate values of the vertex q2 of the window B2, the display level of the window B2 will be further reduced, and if the reduction of the display level of the window B2 to level 1 can make the coordinate values of the vertex p2 of A2 not greater than the coordinate values of the vertex q2 of the window B2, the final display level of the window B2 is level 1 and the corresponding display size of the window B2 is a corresponding size when the display level is level 1.

Moreover, since the final change of the windows A1 and B1 to the windows A2 and B2 is determined according to the respective display levels of the two windows A2 and B2, the windows A2 and B2 may be tangent or separated by a distance.

Similarly, FIG. 3 shows a schematic diagram of squeezing changes of a plurality of windows displayed in an interface according to another embodiment of the present invention. As shown in FIG. 3, the left interface diagram is a positional relationship diagram of upper and lower windows C1 and D1, wherein u1 and u2 are vertices of the window D1, and w1 and w2 are vertices of the window C1. As the pressure value increases, the display level of the window C1 increases, the display size also increases accordingly, and the window W1 will be squeezed to reduce the display size. The final change results are shown in the right interface diagram: the display size of C1 is changed to the size of the window C2, and, accordingly, the display size of D1 is reduced to the size of the window D2; the vertices w1 and w2 of C1 respectively move to the positions corresponding to the vertices W1 and W2 in C2, and the vertices u1 and u2 in D1 respectively move to the positions corresponding to U1 and U2 in D2. The squeezing change relationship between C1 and D1 is the same as the squeezing change principle of the windows A1 and B1 shown in FIG. 2, and thus will not be described again. Unlike the case of the windows in FIG. 2, the closest vertices between the windows C1 and D1 are u1 and w1 as well as u2 and w2, and the vertical coordinates of u1 and u2 are the same and the vertical coordinates of w1 and w2 are the same. Thus, at the time of judging whether the window C1 intersects the window D1, there is only a need to consider the change relationship of the vertical coordinates of any group of vertices of u1 and w1 as well as u2 and w2. In other words, if the group of vertices u1 and w1 are taken into consideration, after the display size of C1 changes toward the direction of the window D1, when the vertical coordinate value of w1 is greater than the vertical coordinate value of the vertex u1 in the window D1 closest thereto, the windows C1 and D1 intersect.

With reference to the description of FIGS. 2 and 3, those skilled in the art should readily understand that if there are squeezing changes between two side-by-side windows in the interface, only by considering a change relationship of the horizontal coordinates of a group of closest vertices between these two windows, whether these two windows intersect can be determined. Likewise, according to FIGS. 2 and 3, the problem of displaying a plurality of windows on the same interface can be easily solved. Further, regardless of the positional relationship of the plurality of windows, the currently operated window and the squeezed and changed windows are all changed according to the display levels of the various windows.

Besides, prior to the step of displaying the windows in the interface according to the display levels, it can also be determined that the application windows are launched in a non-full screen mode.

The determination that the application windows are launched in a non-full screen mode, specifically may comprise: comparing pressure values applied on the icons within a preset time with a preset pressure threshold; and launching the application windows in a non-full screen mode if the pressure values are greater than the pressure threshold. The preset time may be a pressing time t1 preset in Step S11, and the preset pressure threshold may be a pressure threshold b1 set in Step S11. When the icon of the application is pressed for the time t1, the current pressure value is compared with the pressure threshold b1, wherein if the current pressure value is less than the pressure threshold b1, the application window is launched in a non-full screen mode; otherwise, the application window is directly launched in a full screen mode.

Figure 4:
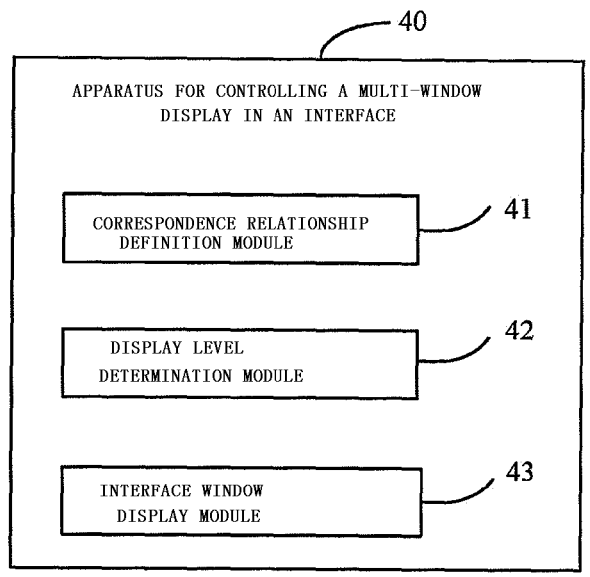
FIG. 4 is a schematic diagram of main modules of an apparatus for controlling a multi-window display in an interface according to an embodiment of the present invention.

FIG. 4 is a schematic diagram of main modules of an apparatus for controlling a multi-window display in an interface according to an embodiment of the present invention.

As shown in FIG. 4, the apparatus 40 for controlling a multi-window display in an interface according to the embodiment of the present invention mainly comprises: a correspondence relationship definition module 41 for defining a correspondence relationship between display levels of windows of a plurality of applications and pressure values applied on icons of the plurality of applications; a display level determination module 42 for determining the display levels of the windows according to the pressure values applied on the icons, the display levels including display sizes; and an interface window display module 43 for displaying the windows in the interface according to the display levels, wherein there are a plurality of windows that have priorities, and the window having the highest priority is the window of a currently operated application, and, if the window having the highest priority intersects other windows when the plurality of windows are displayed, compressing the other windows according to a display size of the window having the highest priority, such that the plurality of windows are displayed in the interface without overlapping one another.

The interface window display module 43 can further be used for: determining whether the window having the highest priority intersects the other windows by judging a positional relationship between a vertex closest to the other windows, among vertices of the window having the highest priority, and the other windows; and for: adjusting display sizes of the other windows according to the display size of the window having the highest priority until the other windows do not intersect the window having the highest priority, wherein the display sizes vary according to the display levels.

The interface window display module 43 can further be used for determining that the application windows are launched in a non-full screen mode. Specifically, pressure values applied on the icons within a preset time are compared a preset pressure threshold; the application windows are launched in a non-full screen mode if the pressure values are greater than the pressure threshold.

Hereinafter, referring to FIG. 5, it shows a structural schematic diagram of a computer system 500 suitable for use in implementing an electronic device according to an embodiment of the present invention. The electronic device shown in FIG. 5 is only an example, and should not impose any limitations on the function and use scope of the embodiment of the present application.

Figure 5:
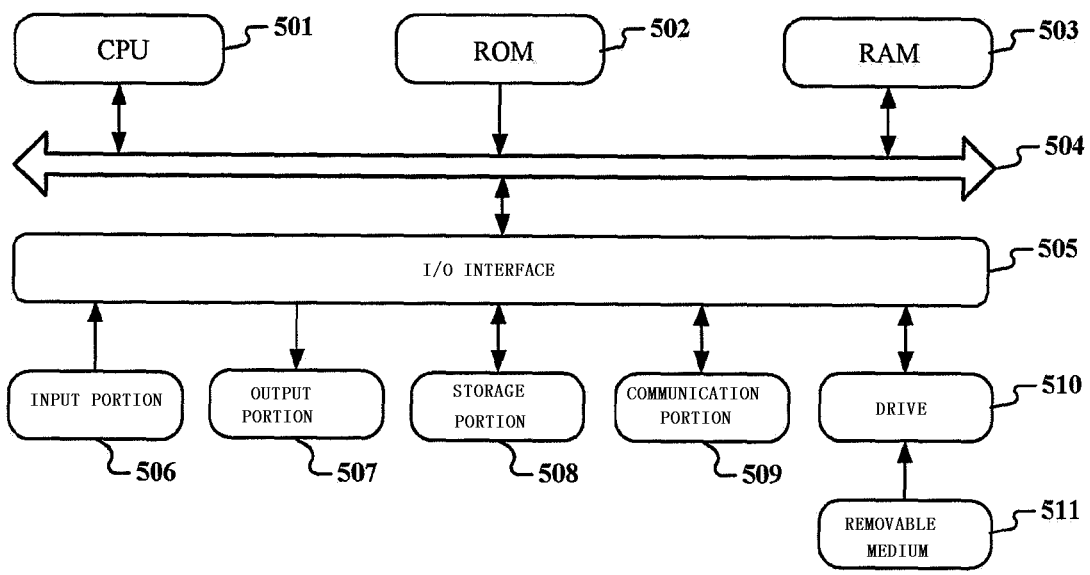
FIG. 5 is a structural schematic diagram of a computer system suitable for use in implementing an electronic device according to an embodiment of the present invention.

As shown in FIG. 5, the computer system 500 comprises a central processing unit (CPU) 501 that can perform various appropriate actions and processes in accordance with a program stored in a read only memory (ROM) 502 or a program loaded from a storage portion 508 into a random access memory (RAM) 503. In the RAM 503, various programs and data required for the operation of the system 500 are also stored. The CPU 501, the ROM 502, and the RAM 503 are connected to each other through a bus 504. An input/output (I/O) interface 505 is also connected to the bus 504.

The following components are connected to the I/O interface 505: an input portion 506 including a keyboard, a mouse, etc.; an output portion 507 including a cathode ray tube (CRT), a liquid crystal display (LCD) and the like as well as a speaker and the like; a storage portion 508 including a hard disk and the like; and a communication portion 509 including a network interface card such as a LAN card, a modem or the like. The communication portion 509 performs communication processing via a network such as the Internet. A drive 510 is also connected to the I/O interface 505 as required. A removable medium 511, such as a magnetic disk, an optical disk, a magneto-optical disk, a semiconductor memory or the like, is installed on the drive 510 as required, so that a computer program read therefrom is installed into the storage portion 508 as required.

In particular, according to an embodiment disclosed by the present invention, the process described above in the schematic diagram of main steps of a method for controlling a multi-window display in an interface may be implemented as a computer software program. For example, the embodiment disclosed by the present invention includes a computer program product comprising a computer program carried on a computer readable medium, the computer program comprising a program code for the method shown in the schematic diagram of main steps of the method for controlling a multi-window display in an interface. In such an embodiment, the computer program can be downloaded and installed from the network via the communication portion 509, and/or installed from the removable medium 511. When the computer program is executed by the central processing unit (CPU) 501, the above-mentioned functions defined in the system of the present application are performed.

There is a need to indicate that the computer readable medium shown in the present invention may be a computer readable signal medium or a computer readable storage medium or any combination of the above two. The computer readable storage medium may be, for example, but not limited to, an electronic, magnetic, optical, electromagnetic, infrared, or semiconductor system, apparatus or device, or any combination of the above. More specific examples of the computer readable storage media may include, but are not limited to, an electrical connection having one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above. In the present application, the computer readable storage medium may be any tangible medium containing or storing a program, which can be used by or in combination with an instruction execution system, apparatus or device. Moreover, in the present application, the computer readable signal medium may include a data signal that is propagated in a baseband or as part of a carrier, wherein a computer readable program code is carried. This propagated data signal can take a variety of forms including, but not limited to, an electromagnetic signal, an optical signal, or any suitable combination of the above. The computer readable signal medium may also be any computer readable medium other than the computer readable storage medium, and the computer readable medium may send, propagate, or transmit a program used by or in combination with an instruction execution system, apparatus or device. The program code contained on the computer readable medium can be transmitted by any suitable medium, including, but not limited to, wireless, wire, optical cable, RF and the like, or any suitable combination of the above.

The main step schematic diagram and block diagram of the method for controlling a multi-window display in an interface in the figures illustrate possible system architectures, functions and operations of the system, method and computer program product according to various embodiments of the present application. In this regard, each block in the main step schematic diagram or block diagram of the method for controlling a multi-window display in an interface can represent a module, a program segment, or part of a code, which includes one or more executable instructions for implementing specified logic functions. It should also be noted that, in some alternative implementations, the functions marked in the blocks may also occur in an order different from that marked in the figures. For example, two successively represented blocks actually can be executed substantially in parallel, and, sometimes, they can also be executed in a reverse order, which depend on the functions involved. There is also a need to note that each block in the block diagram or main step schematic diagram, and the combination of blocks in the block diagram or main step schematic diagram can be realized by a dedicated hardware-based system that performs specified functions or operations, or can be realized by the combination of dedicated hardware and computer instructions.

The modules described in the embodiments of the present invention may be realized by software or by hardware. The described modules may also be disposed in a processor, which, for example, may be described as: a processor comprising a correspondence relationship definition module 41, a display level determination module 42, and an interface window display module 43. The names of these modules therein do not constitute limitations to the modules themselves under certain circumstances. For example, the correspondence relationship definition module 41 can also be described as "a module for defining a correspondence relationship between display levels of windows of a plurality of applications and pressure values applied on icons of the plurality of applications".

In another aspect, the present invention also provides a computer readable medium, which may be included in the device described in the above embodiment or separately present without being assembled into the device. The above computer readable medium carries one or more programs, and, when the above one or more programs are executed by one of the devices, enables the device to include: defining a correspondence relationship between display levels of windows of a plurality of applications and pressure values applied on icons of the plurality of applications; determining the display levels of the windows according to the pressure values applied on the icons, the display levels including display sizes; and displaying the windows in the interface according to the display levels, wherein there are a plurality of windows that have priorities, and the window having the highest priority is the window of a currently operated application, and, if the window having the highest priority intersects other windows when the plurality of windows are displayed, compressing the other windows according to a display size of the window having the highest priority, such that the plurality of windows are displayed in the interface without overlapping one another.

According to the technical solution of the embodiment of the present invention, a correspondence relationship between display levels of windows of a plurality of applications and pressure values applied on icons of the plurality of applications is defined; the display levels of the windows are determined according to the pressure values applied on the icons; and the windows are displayed in the interface according to the display levels, wherein the window having the highest priority is the window of a currently operated application, and, if the window having the highest priority intersects other windows, the other windows are compressed according to a display size of the window having the highest priority, such that the plurality of windows are displayed in the interface without overlapping one another. The use of the technical solution of the embodiment of the present invention can display a plurality of application windows completely and simultaneously on the same interface, can control changes in size of the launched application windows simply by finger pressing, can display the application windows of corresponding sizes at different levels according to different finger pressures, and can also realize changes in size by mutual squeezing between the plurality of application windows, so as to increase convenience, fun and intelligence of the window control.

The above specific embodiments do not constitute limitations to the scope of protection of the present invention. Those skilled in the art should understand that, depending on design requirements and other factors, various modifications, combinations, sub-combinations and replacements may occur. Any modifications, equivalent substitutions, improvements and the like made within the spirit and principle of the present invention shall be included in the scope of protection of the present invention.

The invention claimed is:

1. A method for controlling a multi-window display in an interface, characterized by comprising:

defining, by one or more processors, a correspondence relationship between display sizes of respective windows of a plurality of applications and pressure values applied on respective icons of the plurality of applications, so as to establish a one-to-one correspondence relationship between the display sizes and the pressure values as the pressure values increase;

determining, by the one or more processors, the display sizes of the respective windows of the plurality of applications according to the pressure values applied on the respective icons so as to make the display, sizes of the respective windows different from each other, in such a manner that the display size of the windows increases as the pressure value increases; and displaying, by the one or more processors, the respective windows of the plurality of applications in the interface according to the display sizes, wherein the respective windows have priorities, and the window having the highest priority is the window of a currently operated application, wherein, when the respective windows are simultaneously displayed, in a situation where a position of the window having the highest priority is maintained with respect to the interface as a whole, determining whether the window having the highest priority intersects the other windows by judging a positional relationship between a vertex closest to the other windows, among vertices of the window having the highest priority, and the other windows, and when the window having the highest priority intersects other windows, compressing the other windows with respect to a display size of the window having the highest priority in the situation where the position of the window having the highest priority is maintained with respect to the interface as a whole, such that the plurality of windows are displayed in the interface without overlapping one another and that the display sizes of the respective windows vary according to the respective display sizes.

2. The method according to claim 1, characterized in that:
the step of compressing the other windows according to a display size of the window having the highest priority comprises: adjusting display sizes of the other windows according to the display size of the window having the highest priority until the other windows do not intersect the window having the highest priority.

3. The method according to claim 1, characterized by, prior to the step of displaying the windows in the interface according to the display sizes, comprising: determining that the application windows are launched in a non-full screen mode.

4. The method according to claim 3, characterized in that: the step of determining that the application windows are launched in a non-full screen mode comprises:
comparing pressure values applied on the icons within a preset time with a preset pressure threshold; and
launching the application windows in a non-full screen mode if the pressure values are greater than the pressure threshold.

5. The method according to claim 1, characterized in that: the display sizes of the windows are fixed sizes, or the display sizes increase proportionally as the display sizes increase.

6. An electronic device, characterized by comprising:
one or more processors; and
a memory for storing one or more programs, wherein when the one or more programs are executed by the one or more processors, the one or more processors are enabled to implement a method for controlling a multi-window display in an interface, the method characterized by comprising:

defining a correspondence relationship between display sizes of respective windows of a plurality of applications and pressure values applied on respective icons of the plurality of applications, so as to establish a one-to-one correspondence relationship between the display sizes and the pressure values as the pressure values increase;

determining the display sizes of the respective windows of the plurality of applications according to the pressure values applied on the respective icons so as to make the display sizes of the respective windows different from each other, in such a manner that the display size of the windows increases as the pressure value increases; and displaying the respective windows of the plurality of applications in the interface according to the display sizes, wherein the respective windows have priorities, and the window having the highest priority is the window of a currently operated application, wherein, when the respective windows are simultaneously displayed, in a situation where a position of the window having the highest priority is maintained with respect to the interface as a whole, determining whether the window having the highest priority intersects with other windows by judging a positional relationship between a vertex closest to the other windows, among vertices of the window having the highest priority, and the other windows, and when the window having the highest priority intersects other windows, compressing the other windows with respect to a display size of the window having the highest priority in the situation where the position of the window having the highest priority is maintained with respect to the interface as a whole, such that the plurality of windows are displayed in the interface without overlapping one another and that the display sizes of the respective windows vary according to the respective display sizes.

7. The electronic device according to claim 6,
the step of compressing the other windows according to a display size of the window having the highest priority comprises: adjusting display sizes of the other windows according to the display size of the window having the highest priority until the other windows do not intersect the window having the highest priority.

8. The electronic device according to claim 6,
wherein the method, prior to the step of displaying the windows in the interface according to the display sizes, comprising:
determining that the application windows are launched in a non-full screen mode.

9. The electronic device according to claim 8,
wherein the step of determining that the application windows are launched in a non-full screen mode comprises:
comparing pressure values applied on the icons within a preset time with a preset pressure threshold; and
launching the application windows in a non-full screen mode if the pressure values are greater than the pressure threshold.

10. The electronic device according to claim 6,
wherein the display sizes of the windows are fixed sizes, or the display sizes increase proportionally as the display sizes increase.

11. A computer readable medium, on which a computer program is stored, characterized in that: the program, when executed by a processor, implements a method for controlling a multi-window display in an interface, the method characterized by comprising:

defining a correspondence relationship between display sizes of respective windows of a plurality of applications and pressure values applied on respective icons of the plurality of applications, so as to establish a one-to-one correspondence relationship between the display sizes and the pressure values as the pressure values increase;

determining the display sizes of the respective windows of the plurality of applications according to the pressure values applied on the respective icons so as to make the display sizes of the respective windows different from each other, in such a manner that the display sizes of the windows increases as the pressure value increases; and displaying the respective windows of the plurality of applications in the interface according to the display sizes, wherein the respective windows have priorities, and the window having the highest priority is the window of a currently operated application, wherein, when the respective windows are simultaneously displayed, in a situation where a position of the window having the highest priority is maintained with respect to the interface as a whole, determining whether the window having the highest priority intersects the other windows by judging a positional relationship between a vertex closest to the other windows, among vertices of the window having the highest priority, and the other windows, and when the window having the highest priority intersects other windows, compressing the other windows with respect to a display size of the window having the highest priority in the situation where the position of the window having the highest priority is maintained with respect to the interface as a whole, such that the plurality of windows are displayed in the interface without overlapping one another and that the display sizes of the respective windows vary according to the respective display sizes.

12. The computer readable medium according to claim 11, the step of compressing the other windows according to a display size of the window having the highest priority comprises: adjusting display sizes of the other windows according to the display size of the window having the highest priority until the other windows do not intersect the window having the highest priority.

13. The computer readable medium according to claim 11, wherein the method, prior to the step of displaying the windows in the interface according to the display sizes, comprising:

determining that the application windows are launched in a non-full screen mode.

14. The computer readable medium according to claim 13, wherein the step of determining that the application windows are launched in a non-full screen mode comprises:

comparing pressure values applied on the icons within a preset time with a preset pressure threshold; and launching the application windows in a non-full screen mode if the pressure values are greater than the pressure threshold.

15. The computer readable medium according to claim 11, wherein the display sizes of the windows are fixed sizes, or the display sizes increase proportionally as the display sizes increase.

* * * * *